(12) United States Patent
Hocking et al.

(10) Patent No.: US 11,866,383 B1
(45) Date of Patent: Jan. 9, 2024

(54) NITRIFICATION INHIBITING COMPOSITIONS AND THEIR USE IN AGRICULTURAL APPLICATIONS

(71) Applicant: SYNSUS PRIVATE LABEL PARTNERS, LLC, Houston, TX (US)

(72) Inventors: Douglas Hocking, San Marcos, CA (US); Robert Munion, San Marcos, CA (US)

(73) Assignee: SYNSUS PRIVATE LABEL PARTNERS, LLC, Houston, TX (US)

( * ) Notice: Subject to any disclaimer, the term of this patent is extended or adjusted under 35 U.S.C. 154(b) by 729 days.

(21) Appl. No.: 16/375,087

(22) Filed: Apr. 4, 2019

Related U.S. Application Data

(60) Provisional application No. 62/652,522, filed on Apr. 4, 2018.

(51) Int. Cl.
*C05G 3/90* (2020.01)
*A01C 21/00* (2006.01)
*C05G 5/23* (2020.01)
*C08K 5/315* (2006.01)

(52) U.S. Cl.
CPC ............. *C05G 3/90* (2020.02); *A01C 21/00* (2013.01); *C05G 5/23* (2020.02); *C08K 5/3155* (2013.01)

(58) Field of Classification Search
CPC .... C05G 3/90; C05G 5/20; C05C 1/00; C05C 9/005; C05C 3/005
See application file for complete search history.

(56) References Cited

U.S. PATENT DOCUMENTS

| | | | |
|---|---|---|---|
| 3,152,039 A | 10/1964 | Mattson | |
| 3,353,949 A | 11/1967 | Nau | |
| 3,425,819 A | 2/1969 | Barry et al. | |
| 3,961,932 A | 6/1976 | Miller | |
| 3,986,859 A | 10/1976 | Molinet | |
| 4,234,332 A | 11/1980 | Michaud et al. | |
| 4,294,604 A | 10/1981 | Evrard | |
| 4,517,003 A | 5/1985 | Kolc et al. | |
| 4,530,714 A | 7/1985 | Kolc et al. | |
| 4,943,307 A | 7/1990 | Detre et al. | |
| 5,024,689 A | 6/1991 | Sutton et al. | |
| 5,071,463 A | 12/1991 | Narayanan et al. | |
| 5,106,984 A | 4/1992 | Halpern et al. | |
| 5,160,528 A | 11/1992 | Chaudhuri et al. | |
| 5,352,265 A | 10/1994 | Weston et al. | |
| 5,354,726 A | 10/1994 | Narayanan et al. | |
| 5,364,438 A | 11/1994 | Weston et al. | |
| 5,435,821 A | 7/1995 | Duvdevani et al. | |
| 5,488,734 A | 1/1996 | Bailey et al. | |
| 5,698,003 A | 12/1997 | Omilinsky et al. | |
| 6,019,963 A * | 2/2000 | Kling | A61L 9/01 424/76.1 |
| 6,262,183 B1 | 7/2001 | Domb et al. | |
| 6,830,603 B2 | 12/2004 | Whitehurst et al. | |
| 7,615,232 B2 | 11/2009 | Wurtz et al. | |
| 8,048,189 B2 | 11/2011 | Whitehurst et al. | |
| 3,133,294 A1 | 3/2012 | Whitehurst et al. | |
| 8,562,711 B2 | 10/2013 | Sutton et al. | |
| 8,603,211 B2 | 12/2013 | Rahn et al. | |
| 8,617,425 B2 | 12/2013 | Cigler | |
| 8,809,616 B2 | 8/2014 | Tan et al. | |
| 9,056,804 B2 | 6/2015 | Phillip et al. | |
| 9,394,210 B2 | 7/2016 | Gabrielson et al. | |
| 9,637,420 B2 | 5/2017 | McKnight et al. | |
| 9,732,008 B2 | 8/2017 | McKnight et al. | |
| 9,732,088 B2 | 8/2017 | Walsh et al. | |
| 2003/0211943 A1 | 11/2003 | Harwell | |
| 2004/0163434 A1 | 8/2004 | Quin | |
| 2006/0185411 A1 | 8/2006 | Hojjatie et al. | |
| 2007/0077428 A1 | 4/2007 | Hamed et al. | |
| 2007/0157689 A1 | 7/2007 | Sutton et al. | |
| 2007/0295047 A1 | 12/2007 | Sutton | |
| 2008/0070871 A1 | 3/2008 | Tucke et al. | |
| 2010/0206030 A1 | 8/2010 | Whitehurst et al. | |
| 2010/0206031 A1 | 8/2010 | Whitehurst et al. | |
| 2010/0218575 A1 | 9/2010 | Wissemeier et al. | |
| 2010/0248334 A1 | 9/2010 | McDaniel | |
| 2011/0015076 A1 | 1/2011 | Angst et al. | |
| 2011/0154874 A1 | 6/2011 | Ran et al. | |
| 2011/0233171 A1 | 9/2011 | Hayashi et al. | |
| 2011/0233474 A1 | 9/2011 | Cigler et al. | |
| 2011/0259068 A1 | 10/2011 | Whitehurst et al. | |
| 2011/0259368 A1 | 10/2011 | Hofte et al. | |
| 2011/0296886 A1 | 12/2011 | Gabrielson et al. | |
| 2011/0314383 A1 | 12/2011 | Abdo et al. | |
| 2011/0314883 A1 | 12/2011 | Whitehurst et al. | |
| 2013/0125321 A1 | 5/2013 | Newbould et al. | |
| 2013/0145806 A1 | 6/2013 | Iannotta | |
| 2013/0252960 A1 | 9/2013 | Brewster et al. | |
| 2013/0276495 A1 | 10/2013 | Sutton et al. | |
| 2014/0037570 A1 | 2/2014 | Whitehurst | |
| 2014/0047881 A1 | 2/2014 | Roberts | |

(Continued)

FOREIGN PATENT DOCUMENTS

| | | |
|---|---|---|
| CN | 101200400 A | 6/2008 |
| CN | 101391919 A | 3/2009 |

(Continued)

OTHER PUBLICATIONS

Dow. "Glycol Ether & Solvents Selection Guide". Technical Data Sheet. pp 1-4 <https://www.dow.com/content/dam/dcc/documents/en-us/mark-prod-info/324/324-06467-01-glycol-ethersolvents-selection-guide.pdf> (Year: 2021).*

(Continued)

*Primary Examiner* — Jennifer A Smith
(74) *Attorney, Agent, or Firm* — Carter, DeLuca & Farrell LLP

(57) ABSTRACT

A nitrification inhibiting composition for use in agricultural applications includes from about 5% to about 15% propylene glycol methyl ether and from about 20% to about 35% dicyandiamide. The nitrification inhibiting composition may be combined with a fertilizer and applied to plants or soil to increases the effectiveness of the fertilizer, thereby positively impacting crop yield and quality.

11 Claims, No Drawings

(56) References Cited

U.S. PATENT DOCUMENTS

| | | |
|---|---|---|
| 2014/0047882 A1 | 2/2014 | Gabrielson et al. |
| 2014/0047883 A1 | 2/2014 | Gabrielson |
| 2014/0060132 A1 | 3/2014 | Roberts |
| 2014/0174140 A1 | 6/2014 | Ortiz-Suarez |
| 2015/0143860 A1* | 5/2015 | McKnight ................. C05C 9/00 71/28 |
| 2018/0002246 A1 | 1/2018 | Liu et al. |
| 2019/0039962 A1 | 2/2019 | Colpaert et al. |

FOREIGN PATENT DOCUMENTS

| | | |
|---|---|---|
| EP | 2266400 A1 | 12/2010 |
| GB | 1371694 A | 10/1974 |
| NZ | 586790 A | 6/2012 |
| WO | 9722568 A1 | 6/1997 |
| WO | 2005075602 A1 | 8/2005 |
| WO | 2008000196 A1 | 1/2008 |
| WO | 2013071344 A1 | 5/2013 |
| WO | 2013090324 A1 | 6/2013 |
| WO | 2017100507 A1 | 6/2017 |
| WO | 2018154053 A1 | 8/2018 |

OTHER PUBLICATIONS

Arkema announces its new DMSO website at www.arkema.com/dmso, 2 pages, Nov. 24, 2009, http://www.arkema.com/en/media/news/news-details/Arkema-announc-es-its-new-DMSO-website-at-www.arkema.com-dmso/.

Rick Engel, Volatilization losses from surface-applied urea during cold weather months, Dec. 13-14, 2011, Manitoba Agronomist Conference, Winnipeg, Manitoba.

\* cited by examiner

NITRIFICATION INHIBITING COMPOSITIONS AND THEIR USE IN AGRICULTURAL APPLICATIONS

CROSS-REFERENCE TO RELATED APPLICATIONS

The present application claims the benefit of and priority to U.S. Provisional Patent Application Ser. No. 62/652,522, filed on Apr. 4, 2018, the entire contents of which are incorporated by reference herein.

TECHNICAL FIELD

This disclosure relates to compositions containing a nitrification inhibitor for use in agricultural applications. More specifically, the present disclosure relates to nitrification inhibiting compositions containing dicyandiamide (sometimes referred to herein as "DCD") and propylene glycol methyl ether (sometimes referred to herein as "glycol ether PM"), agricultural fertilizer compositions including such nitrification inhibiting compositions, and uses of such nitrification inhibiting and fertilizer compositions.

BACKGROUND

In the agrochemical industry, farmers use various fertilizers to supply macronutrients to plants either by application to the soil or application to plant leaves. Nitrogen, phosphorus, potassium, calcium, magnesium, and sulfur are macronutrients typically supplied to the plants or soil. In many crops, the amount of nitrogen supplied impacts the overall quality and growth of a crop.

Nitrogen is typically supplied in the form of nitrogenous (e.g., nitrogen precursor-containing), fertilizer compounds, such as urea, ammonium nitrate, or ammonium phosphate. However, due to their high water solubility, applied nitrogen values are lost due to run-off and leaching of the nitrogenous fertilizer compounds. Once applied, the nitrogenous fertilizer compounds are typically degraded to nitrogenous species such as $NH_4^+$, $NO_2^-$, $NO_3^-$, and ammonia gas, which are lost even more readily through evaporation, run-off, and leaching. If degradation of the fertilizer compounds occurs at a rate that is faster than the rate at which nitrogenous degradation products can be used by the plants, then the nitrogen values in the degradation products are at increased risk of being lost.

Nitrification and/or urease inhibitors reduce the loss of nitrogenous degradation products by delaying degradation of the nitrogenous fertilizer compounds. The use of nitrification and/or urease inhibitors in combination with nitrogenous fertilizer compounds tends to increase the amount of time the nitrogen source remains in the soil and available for absorption by the plants, which increases the effectiveness of the fertilizer thereby positively impacting crop yield and quality.

SUMMARY

In accordance with one aspect of the present disclosure, nitrification inhibiting compositions are provided for use in agricultural applications. In embodiments, the nitrification inhibiting compositions include from about 5% to about 15% glycol ether PM and from about 20% to about 35% dicyandiamide ("DCD"). In embodiments, the nitrification inhibiting compositions further include from about 5% to about 20% propylene glycol. In embodiments, the nitrification inhibiting compositions further include from about 50% to about 80% dimethyl sulfoxide ("DMSO"). In embodiments, DCD is present in the nitrification inhibiting composition in an amount from about 29% to about 32%. In embodiments, the nitrification inhibiting composition further includes a urease inhibitor. In embodiments, the nitrification inhibiting compositions have a flashpoint above about 150° F.; in embodiments, above about 200° F.

In accordance with another aspect of the present disclosure, methods of making nitrification inhibiting compositions are provided, wherein a nitrification inhibitor is dissolved in a liquid medium having a favorable toxicological and/or ecological profile. In embodiments, the method includes dissolving DCD in a liquid medium having a favorable toxicological and/or ecological profile. In embodiments, the method includes dissolving from about 20% to about 35% DCD in a liquid medium containing from about 5% to about 15% glycol ether PM. In embodiments, the method includes dissolving from about 20% to about 35% DCD in a liquid medium containing from about 5% to about 15% glycol ether PM, and from about 5% to about 20% propylene glycol. In embodiments, the method includes dissolving from about 20% to about 35% DCD in a liquid medium containing from about 5% to about 15% glycol ether PM, and from about 50% to about 80% DMSO. In embodiments, the method further includes adding a urease inhibitor to the nitrification inhibiting composition.

In accordance with another aspect of the present disclosure, fertilizer compositions are provided, wherein the fertilizer composition includes an effective amount of a nitrification inhibiting composition containing from about 5% to about 15% glycol ether PM, and from about 20% to about 35% DCD, and a fertilizer. In embodiments, the fertilizer is a liquid fertilizer. In embodiments, the fertilizer is a solid fertilizer. In embodiments, the fertilizer includes urea, ammonium nitrate, or anhydrous ammonia. In embodiments, the nitrification inhibiting composition used to formulate the fertilizer composition further includes from about 5% to about 20% propylene glycol. In embodiments, the nitrification inhibiting composition used to formulate the fertilizer composition further includes from about 50% to about 80% DMSO. In embodiments, DCD is present in the nitrification inhibiting composition used to formulate the fertilizer composition in an amount from about 29% to about 32%. In embodiments, the nitrification inhibiting composition used to formulate the fertilizer composition further includes a urease inhibitor. In embodiments, the fertilizer composition includes from about 0.5 quarts to about 5 quarts of the nitrification inhibiting composition per ton of fertilizer. In embodiments, the fertilizer composition includes from about 1.5 quarts to about 3.5 quarts of the nitrification inhibiting composition per ton of fertilizer.

In accordance with another aspect of the present disclosure, methods are provided for preparing a fertilizer composition by combining a fertilizer with an effective amount of a nitrification inhibiting composition containing from about 5% to about 15% glycol ether PM and from about 20% to about 35% DCD. In embodiments, a liquid fertilizer is combined with the nitrification inhibiting composition. In embodiments, a solid fertilizer is combined with the nitrification inhibiting composition. In embodiments, the fertilizer is combined with the nitrification inhibiting composition includes urea, ammonium nitrate, or anhydrous ammonia. In embodiments, the fertilizer is combined with a nitrification inhibiting composition containing from about 5% to about 15% glycol ether PM, from about 20% to about 35% DCD, and from about 5% to about 20% propylene glycol. In embodiments, the fertilizer is combined with a nitrification inhibiting composition containing from about 5% to about 15% glycol ether PM, from about 20% to about 35% DCD, and from about 50% to about 80% DMSO. In embodiments, the fertilizer is combined with a nitrification inhibiting composition that further contains a urease inhibitor. In embodiments, the fertilizer is combined with a nitrification inhibiting composition containing DCD in an amount from about 29% to about 32%. In embodiments, from about 0.5 quarts to about 5 quarts of the nitrification inhibiting composition per ton of fertilizer. In embodiments, from about 1.5 quarts to about 3.5 quarts of the nitrification inhibiting composition per ton of fertilizer.

In accordance with another aspect of the present disclosure, methods are provided for reducing the loss of nitrogen by run off and denitrification by applying a fertilizer composition to plants or soil, the fertilizer composition including a fertilizer combined with an effective amount of a nitrification inhibiting composition containing from about 5% to about 15% glycol ether PM, and from about 20% to about 35% DCD. In embodiments, the fertilizer composition applied includes a liquid fertilizer combined with the nitrification inhibiting composition. In embodiments, the fertilizer composition applied includes a solid fertilizer combined with the nitrification inhibiting composition. In embodiments, the fertilizer composition applied includes a fertilizer including urea, ammonium nitrate, or anhydrous ammonia combined with the nitrification inhibiting composition. In embodiments, the fertilizer composition applied includes the fertilizer combined with a nitrification inhibiting composition containing from about 5% to about 15% glycol ether PM, from about 20% to about 35% DCD, and from about 5% to about 20% propylene glycol. In embodiments, the fertilizer composition applied includes the fertilizer combined with a nitrification inhibiting composition containing from about 5% to about 15% glycol ether PM, from about 20% to about 35% DCD, and from about 50% to about 80% DMSO. In embodiments, the fertilizer composition applied includes the fertilizer combined with a nitrification inhibiting composition containing DCD in an amount from about 29% to about 32%. In embodiments, the fertilizer composition applied includes the fertilizer combined with a nitrification inhibiting composition containing a urease inhibitor. In embodiments, the fertilizer composition applied includes from about 0.5 quarts to about 5 quarts of the nitrification inhibiting composition combined with about a ton of fertilizer. In embodiments, the fertilizer composition applied includes from about 1.5 quarts to about 3.5 quarts of the nitrification inhibiting composition combined with about a ton of fertilizer.

In embodiments, the methods include combining the nitrification inhibiting composition with the fertilizer before application of the fertilizer composition to the plants or soil. In embodiments, the methods include combining the nitrification inhibiting composition with the fertilizer at the time of application of the fertilizer composition to the plants or soil. In embodiments, the methods include combining the nitrification inhibiting composition with the fertilizer after application of the fertilizer to the plants or soil.

DETAILED DESCRIPTION

The Nitrification Inhibiting Compositions

In accordance with one aspect of the present disclosure, nitrification inhibiting compositions are provided for use in agricultural applications. Nitrification inhibitors slow the process of ammonium conversion to nitrate, and subsequently the loss of nitrate to leeching, thus making ammonium (a typical component of fertilizers and one of the main sources of nitrogen that can be utilized by plants) available to plants in the soil for longer periods of time. Increasing the amount of time that the nitrogen is available to the plant increases the effectiveness of the fertilizer which positively impacts crop yield and quality. DCD (also known as "2-cyanoguanidine") is useful as a nitrification inhibitor in aqueous agricultural applications, e.g., end use fertilizer compositions, and has the formula:

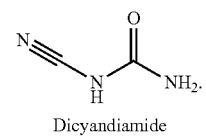

Dicyandiamide

DCD is commercially available or can be made by treating cyanamide with a base. Nitrification inhibitors generally have low solubility in water (about 41 grams per liter for DCD) and are generally difficult to incorporate into aqueous end use fertilizer compositions, particularly under field conditions. In accordance with embodiments of the present disclosure, the nitrification inhibitor is therefore combined with a solvent system that has a favorable toxicological and/or ecological profile and desirable characteristics, e.g., in terms of low volatility, biodegradability, low toxicity, or low hazard level.

In one aspect, nitrification inhibiting compositions in accordance with embodiments of the present disclosure include DCD dissolved in a liquid medium containing glycol ether PM, alone or in combination with at least one of DMSO or propylene glycol.

Nitrification inhibiting compositions in accordance with embodiments of the present disclosure may contain DCD in an amount from about 0.5% by weight of the nitrification inhibiting composition to about 50% by weight of the nitrification inhibiting composition. In embodiments, DCD may be present in the nitrification inhibiting composition in an amount from about 1% by weight of the nitrification inhibiting composition to about 40% by weight of the nitrification inhibiting composition. In embodiments, DCD may be present in the nitrification inhibiting composition in an amount from about 0.5% by weight of the composition to about 20% by weight of the nitrification inhibiting composition. In embodiments, DCD may be present in the nitrification inhibiting composition in an amount from about 1% by weight of the composition to about 30% by weight of the nitrification inhibiting composition. In embodiments, DCD may be present in the nitrification inhibiting composition in an amount from about 29% by weight of the composition to about 32% by weight of the nitrification inhibiting composition.

Nitrification inhibiting compositions in accordance with embodiments of the present disclosure contain a glycol ether, such as glycol ether PM in an amount from about 5% by weight of the nitrification inhibiting composition to about 15% by weight of the nitrification inhibiting composition. In embodiments, glycol ether PM may be present in the nitrification inhibiting composition in an amount from about 8% by weight of the nitrification inhibiting composition to about 12% by weight of glycol ether PM composition.

In addition to the nitrification inhibitor and the glycol ether, glycol ether PM compositions in accordance with embodiments of the present disclosure may contain one or more protic solvents. In embodiments, the protic solvent is propylene glycol in an amount from about 5% by weight of the nitrification inhibiting composition to about 20% by weight of the nitrification inhibiting composition. In embodiments, propylene glycol may be present in the nitrification inhibiting composition in an amount from about 8% by weight of the nitrification inhibiting composition to about 15% by weight of the nitrification inhibiting composition.

Nitrification inhibiting compositions in accordance with embodiments of the present disclosure may alternatively contain one or more aprotic solvents. In embodiments, DMSO is the aprotic solvent and is present in an amount from about 50% by weight of the nitrification inhibiting composition to about 80% by weight of the nitrification inhibiting composition. In embodiments, DMSO may be present in the nitrification inhibiting composition in an amount from about 55% by weight of the nitrification inhibiting composition to about 65% by weight of the nitrification inhibiting composition.

In accordance with embodiments of the present disclosure, the nitrification inhibiting compositions include: from about 5% to about 15% glycol ether PM; from about 20% to about 35% DCD; from about 5% to about 20% propylene glycol; and from about 50% to about 80% DMSO.

In embodiments, nitrification inhibiting compositions according to the present disclosure optionally further include a urease inhibitor, such as, for example, N-(n-butyl)-thiophosphoric triamide ("NBPT"), in addition to a nitrification inhibitor. Thus, nitrification inhibiting compositions in accordance with embodiments of the present disclosure may contain a urease inhibitor in an amount up to about 50% by weight of the nitrification inhibiting composition. In embodiments, the urease inhibitor may be present in the nitrification inhibiting composition in an amount from about 10% by weight of the nitrification inhibiting composition to about 40% by weight of the nitrification inhibiting composition.

In embodiments, a dye or colorant may be added to the nitrification inhibiting compositions to aid in visual assessment of uniformity of coating during the coating of a granular fertilizer as described in more detail below, or in visual assessment of uniform mixing during the combination with liquid fertilizers also as described in more detail below. In embodiments, the colorant can be selected from any nontoxic common food dye and may be present in the nitrification inhibiting compositions in an amount up to about 5% of the nitrification inhibiting composition. In embodiments, the colorant may be present in an amount from about 0.001% by weight of the nitrification inhibiting composition to about 2.5% by weight of the nitrification inhibiting composition. In embodiments, scents or masking agents may be added to improve the odor of the nitrification inhibiting compositions. When present, scents or masking agents may be used in an amount up to about 5% of the nitrification inhibiting composition. In embodiments, the scents or masking agents may be present in an amount from about 0.1% by weight of the nitrification inhibiting composition to about 3% by weight of the nitrification inhibiting composition. In addition, one or more of surfactants, buffers, micro-nutrients, drying agent, and/or flow modifiers may be included in the nitrification inhibiting compositions.

In embodiments, nitrification inhibiting compositions in accordance with the present disclosure have a flashpoint above about 150° F., in embodiments, above about 200° F.

To make nitrification inhibiting compositions in accordance with the present disclosure, a nitrification inhibitor is dissolved in a liquid medium having a favorable toxicological and/or ecological profile. While there are no particular limitations on the order in which the various ingredients are combined, and the order of addition can be suitably selected corresponding to the properties of each ingredient, in an illustrative method, the components of the liquid medium (glycol ether and aprotic or protic solvent) are added to a mixing tank equipped with a mixer. These components are mixed sufficiently, with or without heating, to provide substantial homogeneity. Where heat is applied, the materials may be heated to any temperature that assists in achieving a homogenous solution without resulting in significant degradation of the material. When used, heating may be to a temperature of from about 100° F. to about 250° F., in embodiments from about 150° F. to about 200° F. The nitrification inhibitor and/or urease inhibitor is then added in an amount sufficient to produce a composition that meets the product label guarantee, and the resulting solution is allowed to stir for a time sufficient to ensure dissolution of the nitrification inhibitor and/or urease inhibitor. Next, any other ingredients (colorant, scent, surfactant, etc.) are added to the solution with mixing. Finally, the solution may be filtered to remove any solids that may be present.

The Fertilizer Compositions

In accordance with another aspect of the present disclosure, fertilizer compositions are provided. The present fertilizer compositions include a fertilizer combined with a nitrification inhibiting composition in accordance with the foregoing description.

Because nitrification inhibitors, such as DCD, have a generally low solubility, they are used at low concentrations in water making it difficult to evenly distribute the nitrification inhibitors on fertilizer prills and in soil. In order to evenly distribute the nitrification inhibitors onto fertilizer prills or granules, the nitrification inhibitors may be dispersed into a solvent carrier to form the presently described nitrification inhibiting compositions prior to being combined with the fertilizer. Thus, the use of the presently described nitrification inhibiting compositions is desirable since, being in liquid form, the solvent system is capable of distributing the nitrification inhibitor onto fertilizer granules or prills, and into liquid fertilizers.

The fertilizer employed in fertilizer compositions in accordance with the present disclosure may be in solid or liquid form and may be any water-soluble fertilizer that provides nutrients such as phosphorus-based, nitrogen-based, potassium-based, or sulphur-based fertilizers. In embodiments, the fertilizer includes one or more nitrogenous compounds. Thus, in embodiments, a solid fertilizer composition is prepared by combining particles, prills, granules, or any other solid form of fertilizer containing nitrogenous compounds with a nitrification inhibiting composition in accordance with the foregoing description. In embodiments, a liquid fertilizer composition is prepared by combining a liquid fertilizer containing nitrogenous compounds with a nitrification inhibiting composition in accordance with the foregoing description.

Non-limiting examples of nitrogen-based fertilizers include: nitrates or nitrate salts, such as calcium nitrate, nitrate soda, calcium cyanamide, sodium nitrate, potassium nitrate; ammonium salts, such as ammonium chloride, ammonium nitrate, calcium ammonium nitrate, ammonium sulfate, ammonium thiosulfate, ammonium polysulfide, ammonium chloride, ammonium bicarbonate; anhydrous ammonia; and ammonium phosphates, such as mono-ammonium phosphate, di-ammonium phosphate and ammonium polyphosphate. In embodiments, the fertilizer contains urea or urea ammonium nitrate. In embodiments, fertilizer compositions in accordance with the present disclosure include concentrated ammonium nitrate compositions, such as, for example, solutions of urea and ammonium nitrate, including UAN 18, UAN 28, UAN 30, UAN 32, and the like. Such fertilizers are commercially available under the trade name URAN from Arcadian Corp., Memphis, TN. It should be understood that fertilizer compositions in accordance with the present disclosure may include one, or a combination fertilizers.

In embodiments, the fertilizer composition includes from about 0.5 quarts to about 5.0 quarts of the nitrification inhibiting composition combined with from one ton of the fertilizer. In embodiments, the fertilizer composition includes from about 1.5 quarts to about 3.5 quarts of the nitrification inhibiting composition combined with from one ton of the fertilizer.

The nitrification inhibiting composition is combined with fertilizer using any technique within the purview of one skilled in the art. In embodiments, the nitrification inhibiting composition is combined with the fertilizer before application of the fertilizer composition to the plants or soil. In embodiments, the nitrification inhibiting composition is combined with the fertilizer at the time of application of the fertilizer composition to the plants or soil. In embodiments, the nitrification inhibiting composition is combined with the fertilizer after application of the fertilizer to the plants or soil.

In embodiments where the fertilizer is in liquid form, contacting the fertilizer with the nitrification inhibiting composition may be conducted, for example, by simply mixing the nitrification inhibiting composition of the present disclosure with the liquid fertilizer to make a fertilizer composition in accordance with the present disclosure. In embodiments, the fertilizer composition is made by combining the nitrification inhibiting composition of the present disclosure with a liquid fertilizer to form a liquid nitrification-inhibited fertilizer composition and subsequently diluting the liquid nitrification-inhibited fertilizer composition with an aqueous medium, such as, for example, water. There are no particular limitations on the water used in this or other embodiments. Non-limiting examples of suitable waters include tap water, purified water, distilled water, ion exchange water, pure water, ultra-pure water, sterile water, or filtered water. In addition, one or more of surfactants, buffers, micro-nutrients, drying agent, and/or flow modifiers may be included in the fertilizer compositions.

In embodiments, the fertilizer compositions are liquid compositions including, based on 100 parts by weight of the composition: (a) up to about 99 parts by weight of one or more nitrogenous fertilizer compounds, (b) DCD, (c) an organic solvent selected from polar aprotic solvents, amine solvents, heterocyclic alcohol solvents, and mixtures thereof, and (d) water.

In embodiments where the fertilizer is in solid particulate form, contacting the fertilizer with the nitrification inhibiting composition may be conducted, for example, by spraying the nitrification inhibiting composition of the present disclosure on the particles of solid fertilizer to make a fertilizer composition in accordance with the present disclosure. In addition, one or more of surfactants, buffers, micro-nutrients, drying agent, and/or flow modifiers may be included in the fertilizer compositions. In embodiments, the fertilizer composition is made by combining the nitrification inhibiting composition of the present disclosure with a solid fertilizer to form a solid nitrification-inhibited fertilizer composition and subsequently dissolving the solid nitrification-inhibited fertilizer composition in an aqueous medium, such as, for example, water. In embodiments, solid nitrification-inhibited fertilizer compositions in accordance with the present disclosure include, based on 100 parts by weight ("pbw") of the composition: from about 60 pbw to about 99.999 solid particles of one or more nitrogenous fertilizer compounds and from about 0.001 to about 40 pbw dicyandiamide. In embodiments, fertilizer compositions include, from about 75 pbw to about 99.999 solid particles of one or more nitrogenous fertilizer compounds and from about 0.001 to about 25 pbw dicyandiamide.

In embodiments, the end use fertilizer composition is applied to target plants or to an environment for the target plants at a rate effective to provide a dosage of nitrogenous fertilizer compound of from about 0.01 pounds to about 5 pounds of fertilizer compound per 100 square feet of ground; in embodiments from about 0.05 pounds to 2 pounds of nitrogenous fertilizer compound, per 100 square feet of ground.

In embodiments, the end use fertilizer composition is applied to target plants or to an environment for the target plants at a rate effective to provide a dosage of dicyandiamide of from about 0.01 pounds to 5 pounds of dicyandiamide per 1000 square feet of ground; in embodiments from about 0.05 pounds to 2 pounds of dicyandiamide per 1000 square feet of ground.

Embodiments of compositions and methods in accordance with the present disclosure are illustrated in the following example. This example is provided for illustrative purposes and is not considered a limitation on the scope of present compositions and methods.

Example—Making a Nitrification Inhibiting Composition

A 6,000-gallon mixer, equipped with an electric mixer that has three prop-style mixing blades in series on a central shaft is used to produce a DCD-containing nitrification inhibiting composition. The tank itself is a stainless-steel cone-bottom tank with a 33 degree slope with a set of four baffles to allow for turbulent laminar flow.

59.3% w/w of dimethyl sulfoxide and 10% w/w of propylene glycol methyl ether are added to the tank. This solution is heated to 80° C. and given 4-6 hours to mix. 28.2% dicyandiamide is then added, and the resulting solution is allowed to stir for 1 hour to ensure dissolution of the DCD.

The resulting solution is light yellow and has a strong garlic-like odor. 1.50% w/w of benzaldehyde and 0.5% w/w diglycolamine are then added to the solution. The cherry scent of the benzaldehyde masks the garlic-like odor from the DMSO, yielding a light-yellow solution with a bubble gum-like odor. Finally, 0.48% w/w of FD&C Blue #1 is added to change the finished solution to the make the desired product color. The final product is passed through a 25 micron filter to remove any particulates.

The compositions in accordance with the present disclosure may provide improved ease of handling of DCD, improved solubility characteristics, low toxicity of the organic solvents, good storage characteristics, and excellent miscibility with aqueous compositions, such as aqueous nitrogenous fertilizer formulations.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

The compositions and methods described herein are non-limiting, exemplary embodiments, and not intended as limitations on the scope of the claims. Changes therein and other uses will occur to those skilled in the art who have read this disclosure. Such changes and other uses can be made without departing from the scope of the invention as set forth in the claims.

What is claimed is:

1. A nitrification inhibiting composition for use in agricultural applications comprising from about 5% to about 15% propylene glycol methyl ether and from about 20% to about 35% dicyandiamide.

2. The nitrification inhibiting composition of claim 1 further comprising from about 5% to about 20% propylene glycol.

3. The nitrification inhibiting composition of claim 1 further comprising from about 50% to about 80% dimethyl sulfoxide.

4. The nitrification inhibiting composition of claim 1 containing dicyandiamide in an amount from about 29% to about 32%.

5. The nitrification inhibiting composition of claim 1 further comprising a urease inhibitor.

6. A fertilizer composition comprising:
a nitrification inhibiting composition as in claim 1; and
a fertilizer.

7. The fertilizer composition of claim 6 wherein the fertilizer is a liquid fertilizer.

8. The fertilizer composition of claim 6 wherein the nitrification inhibiting composition used to formulate the fertilizer composition further includes from about 5% to about 20% propylene glycol.

9. The fertilizer composition of claim 6 wherein the nitrification inhibiting composition used to formulate the fertilizer composition further includes from about 50% to about 80% dimethyl sulfoxide.

10. The fertilizer composition of claim 6 wherein the nitrification inhibiting composition used to formulate the fertilizer composition further includes a urease inhibitor.

11. The fertilizer composition of claim 6 comprising from about 0.5 quarts to about 5 quarts of the nitrification inhibiting composition and about a ton of the fertilizer.

* * * * *